Nov. 7, 1961  W. C. SMITH  3,007,889
VULCANIZATION OF ISOOLEFIN-POLYOLEFIN POLYMERS
Filed Aug. 8, 1956  2 Sheets-Sheet 1

Winthrope C. Smith  Inventor
By W. H. Smyers.  Attorney

Nov. 7, 1961 W. C. SMITH 3,007,889
VULCANIZATION OF ISOOLEFIN-POLYOLEFIN POLYMERS
Filed Aug. 8, 1956 2 Sheets-Sheet 2

Winthrope C. Smith   Inventor
By W. H. Smyers   Attorney

United States Patent Office 3,007,889
Patented Nov. 7, 1961

3,007,889
VULCANIZATION OF ISOOLEFIN-POLYOLEFIN POLYMERS
Winthrope C. Smith, Westfield, N.J., assignor to Esso Research and Engineering Company, a corporation of Delaware
Filed Aug. 8, 1956, Ser. No. 602,750
8 Claims. (Cl. 260—38)

The present invention relates to a process for modifying copolymers of isoolefins and multiolefins and novel materials produced thereby. More particularly, it relates to vulcanizing butyl rubber, especially brominated butyl rubber and combinations of brominated butyl rubber and non-brominated butyl rubber with a hydroxy aromatic dialcohol compound. The rubbery copolymers which come within the scope of the present invention contain a major portion, preferably at least 85 wt. percent, of isoolefins, and a minor portion, preferably not more than 15 wt. percent, of multiolefins.

It is known that interpolymers, such as butyl rubber, which have a low degree of unsaturation have a slow reactivity to curing or vulcanizing agents such as sulfur. Brominated butyl rubber, while it has a tendency to cure faster than butyl rubber, still possesses the undesirably low cure rate associated with butyl type rubbers.

It has now been discovered that the cure rate of brominated butyl rubber is markedly accelerated by vulcanizing it in the presence of a hydroxy aromatic dialcohol compound, particularly a phenol dialcohol, such as 2,6-dimethylol hydrocarbon substituted phenol.

Furthermore, it has been discovered that certain mixtures of butyl rubber and brominated butyl rubber have a higher curing rate than butyl rubber alone when the vulcanzation is brought about in the presence of a phenol dialcohol compound.

Figure 1:
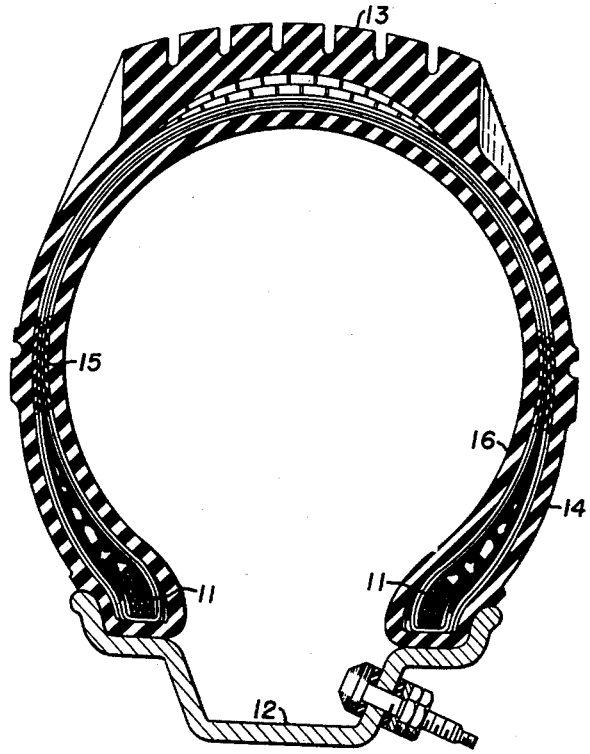
Figure 2:
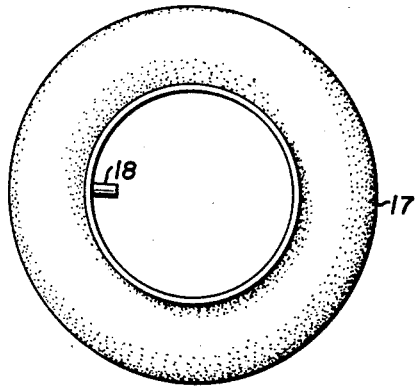
Figure 3:
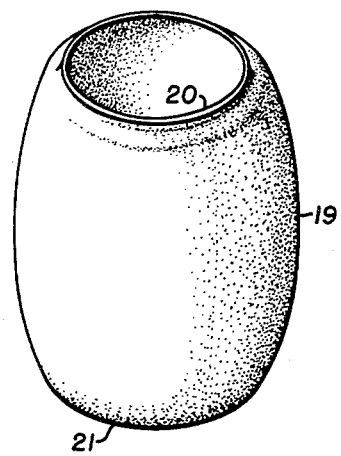
Figure 4:
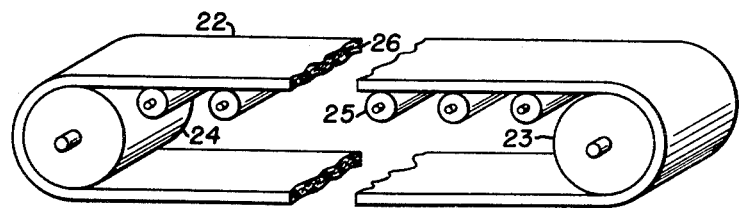
Figure 5:
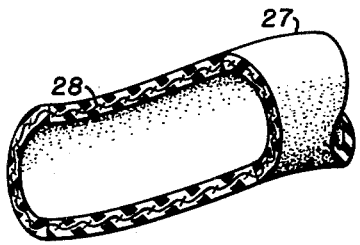

The invention will be better understood from the following description, wherein reference will be made to the drawing in which FIGURE 1 is a vertical section of a pneumatic tubeless tire; FIGURE 2 is a view in side elevation of a curing bag used in vulcanization processes; FIGURE 3 is a perspective view of a hollow, cylindrical curing bladder used in Bag-O-Matic tire presses; FIGURE 4 is an edgewise perspective view of a conveyor belt, partly broken away; and FIGURE 5 is a perspective view, partly in section, of a hose. All of the foregoing articles contain rubbery copolymers which have been cured in accordance with the present invention.

Butyl rubber comprises a copolymer containing between about 85 to 99.5%, preferably between about 95 and 99.5%, of a $C_4$ to $C_8$ isoolefin, such as isobutylene, the remainder being a $C_4$ to $C_{10}$ multiolefin, preferably a $C_4$ to $C_6$ conjugated diolefin such as butadiene, dimethyl butadiene, piperylene, or isoprene. Of the foregoing, isoprene is especially preferred. The preparation of butyl type rubbers is described in U.S. Patent 2,356,128, and also in other patents and chemical literature.

The brominated butyl rubber component used in this invention contains at least 0.5, preferably at least 2.0 wt. percent bromine, but not more than about 0.5 "X" to 3 "X" wt. percent and preferably not more than about "X" to 1.5 "X" wt. percent combined bromine wherein:

$$X = \frac{79.92L}{(100-L)M_1 + L(M_2+79.92)} \times 100$$

and:

$L$ = mole percent of the multiolefin in the polymer
$M_1$ = molecular weight of the isoolefin
$M_2$ = molecular weight of the multiolefin
79.92 = atomic weight of bromine The above brominated butyl rubber is produced by reacting the unvulcanized butyl rubber with bromine or bromine-containing compounds so that the polymer preferably contains at least 0.5 weight percent of combined bromine but not more than about 3 atoms of bromine combined in the polymer per molecule of multiolefin present therein, i.e., generally not more than about 3 atoms of combined bromine per double bond in the polymer.

Suitable brominating agents which may be employed are molecular bromine, alkali metal bromites (preferably sodium hypobromite), sulfur bromides (particularly oxygenated sulfur bromide), pyridinium bromide perbromide, N-bromo-succinimide, alpha-bromo acetanilide, tri-bromophenol bromide, N-bromoacetamide, beta-bromo-methyl phthalimide and other common brominating agents. The preferred brominating agents are molecular bromine and/or those bromine compounds which are known to lead to allylic substitution, for example, N-bromo succinimide, beta-bromoethyl phthalimide, N-bromoacetamide, etc. The bromination is advantageously conducted at about −30° to 100° C., preferably at about 20° to 80° C. for about 1 minute to several hours. However, the temperatures and times are regulated to brominate the rubbery copolymer to the extent set forth above.

The bromination may be accomplished in various ways. One process comprises preparing a solution of the copolymer in a suitable inert liquid organic solvent, such as an inert hydrocarbon or halogenated derivatives of saturated hydrocarbons. Examples of suitable solvents are hexane, heptane, naphtha, kerosene, straight-run mineral spirits, benzene, chlorobenzene, chloroform, carbon tetrachloride, etc. The bromine or other brominating agent is preferably added in solution form. It may be dissolved in a suitable solvent such as an alkyl chloride or carbon tetrachloride. Another variation comprises employing liquid bromine. Still a further method resides in blending with a solid copolymer a solid brominating agent which is known to lead to allylic substitution, such as N-bromo succinimide. In such a case, the blend formed is preferably mill mixed and heated to a temperature sufficient to brominate the solid copolymer. The use of elevated or depressed pressures is optional since atmospheric pressure is satisfactory. However, the pressure may vary, depending upon the foregoing temperatures and reaction times from about 1 to 400 lbs. per square inch.

The brominated butyl rubber generally has an iodine number between 0.5 and 50, and a Staudinger molecular weight between 20,000 and 80,000. It is preferred that the molecular weight be between 30,000 and 60,000.

The phenol dialcohols employed in the practice of this invention are prepared by reacting a substituted phenol having the 2 ortho positions unoccupied, with a considerable molar excess of formaldehyde, the molar ratio of formaldehyde to phenol typically being 2:1, in the presence of a strong alkaline catalyst, especially an alkali metal hydroxide, which is subsequently neutralized. The mixture of phenol, formaldehyde and alkaline catalyst is heated between 25 to 100° C., the first stage of the reaction involving the formation of the phenol methylol, that is, the para substituted 2,6-dimethylol phenol. This material, which is a phenol dialcohol, can be isolated by acidification of the mixture and separation of the oily layer. It can then be advanced to higher molecular weight formed by heating between about 75 and 175° C. This higher molecular weight form is oil-soluble and heat reactive, and has the advantage that it is more reactive with rubber than the lower molecular weight form. Care should be taken to stop while the resin is in a soluble and fusible state. The phenol from which the dimethylol phenol is made generally has a hydrocarbon group in the position para to the phenolic hydroxyl, examples being alkyl groups, especially alkyl groups having from 3 to 20 carbon atoms, tertiary butyl and tertiary octyl (alpha, alpha, gamma, gamma-tetra-methyl butyl) being especially preferred.

Examples of suitable dimethylol phenols that may be used in the invention either in the polymeric or monomeric form are 2,6-dimethylol-4-methyl phenol, 2,6-dimethylol-4-tertiary butyl phenol, 2,6-dimethylol-4-octyl phenol, 2,6-dimethylol-4-dodecyl phenol and 2,6-dimethylol-4-phenyl phenol.

Generally between about 5 and 20 parts by weight of the phenol dialcohol is employed per 100 parts of rubber, but it is preferred to use between about 8 and 15 parts by weight.

In combination with the rubber and phenol dialcohol compound about 0 to 50 parts by weight of the basic metal compound, such as zinc oxide, may be employed. The addition of the basic metal leads to improved physical properties for the same concentration of dimethylol phenol. These vulcanizable compositions are then cured at an increased rate at a temperature between about 250 and 400° F. The curing time may be from about 1 minute up to several hours, depending upon the temperature and other conditions. It is generally preferred to cure at a temperature between about 270 and 350° F. for about 1 minute up to 2 hours.

In addition, the rubber composition may contain from about 20 to 150 parts by weight of a filler, such as carbon black or silica, per 100 parts by weight rubber.

Furthermore, isoolefin-polyolefin interpolymers contaning other interpolymerized monomers, such as styrene and other monoolefinic monomers, may also be employed to prepare various derivatives.

The butyl rubber should have a Staudinger molecular weight of at least 20,000. It is preferred that it have a molecular weight between about 30,000 and 100,000, and it is especially preferred that the molecular weight be between 30,000 and 70,000.

Butyl rubber is generally made from isobutylene and isoprene which is dissolved in liquid methyl chloride in a ratio of about 94 to 99 parts by weight isobutylene to 1 to 6 parts by weight isoprene. To this mixture is added a solution of aluminum chloride dissolved in methyl chloride in sufficient quantities to correspond to about 0.2 parts by weight of aluminum chloride per 100 parts by weight of reactant. Polymerization is then conducted at about —100° C. The solvent is then stripped off and the catalyst inactivated by water washing. The rubbery polymer recovered is dissolved in a liquid hydrocarbon and brominated according to known techniques.

In the practice of one embodiment of the present invention, 100 parts by weight of brominated butyl rubber is compounded with about 5 to 20 parts by weight of a phenol dialcohol resin. To the above composition may be added from about 2 to 20 parts by weight of zinc oxide. Rubber fillers, such as carbon black and silica, may be added in conventional quantities. The vulcanizable composition is then cured at an increased rate at a temperature between about 250 and 400° F.

In another embodiment of the present invention, 100 parts by weight of butyl rubber is compounded with about 5 to 20 parts by weight of a phenol dialcohol resin, and between about 2 and 50 parts by weights of a brominated butyl rubber per 100 parts butyl rubber. It is preferred to use between about 2 and 20 parts by weight of the brominated butyl rubber, and especially 3 and 10 parts by weight.

In order to more fully illustrate the present invention, the following experimental data are given. The quantities expressed in the formula are in parts by weight.

EXAMPLE I

Brominated butyl rubber which contained 3 wt. percent of combined bromine, had a Staudinger molecular weight of 40,000 and a Mooney viscosity of 51 at 212° F., was compounded according to the following two recipes:

| Ingredients | A | B |
|---|---|---|
| Brominated Butyl Rubber | 100 | 100 |
| Zinc oxide | 5 | 5 |
| Stearic Acid | 1 | 1 |
| Carbon Black (HAF) | 60 | 60 |
| Amberol ST-137 | | 12 |

Amberol ST-137 is a trade designation of Rohm & Haas Co. for a mixture of phenolic resin believed to be made directly from one mol of para-octylphenol, two mols of formaldehyde and one mol of sodium hydroxide. The excess alkali is carefully neutralized after the condensation is complete. The resin has a melting point (ball and ring method) between 80 and 90° C. and a specific gravity of 1.04.

The above recipes were cured for 20 minutes at 320° F. and evaluated for their physical properties. The results of this evaluation are set forth in Table I.

Table I

| Physical Properties | A | B |
|---|---|---|
| Tensile Strength, p.s.i | 1,640 | 2,020 |
| Elongation, percent | 250 | 230 |
| Modulus at 100% E, p.s.i | 610 | 720 |
| Shore "A" Hardness | 75 | 78 |

The data show that phenol dialcohol compounds significantly increase the rate of cure of brominated butyl rubber. A comparison of the physical properties shows that the brominated butyl rubber cured in the presence of Amberol ST-137 had a tensile strength advantage of about 400 p.s.i. over the brominated butyl rubber cured with zinc oxide alone. In addition its modulus at 100% elongation was about 100 p.s.i. greater than the control (Recipe A).

EXAMPLE II

The vulcanizates of recipes A and B, above, were aged at 400° F. for 4 and 16 hours, respectively. The effect of aging these samples at a high temperature is shown below.

Table II

| Physical Properties | A | B |
|---|---|---|
| Aged 4 hours at 400° F.: | | |
| Tensile Strength, p.s.i | 1,070 | 1,480 |
| Elongation, percent | 170 | 130 |
| Modulus at 100% E, p.s.i | 660 | 1,120 |
| Shore "A" Hardness | 78 | 86 |
| Aged 16 hours at 400° F.: | | |
| Tensile strength, p.s.i | 560 | 920 |
| Elongation, percent | 110 | 85 |
| Modulus at 100% E, p.s.i | 550 | |
| Shore "A" Hardness | 74 | 87 |

The aging study clearly shows that the improved vulcanizates of the present invention are heat stable. The brominated rubber compounded with the phenolic resin maintained its tensile strength advantage over the control (Recipe A) throughout both the 4 hour and 16 hour aging test. Furthermore the former had about a 500 p.s.i. advantage over the control at 100% elongation after aging 4 hours at 400° F. These results are indicative of the vulcanizates obtained according to the present invention.

EXAMPLE III

In another group of experiments, the effect of curing butyl rubber having a Mooney viscosity at 212° F. of 41 to 49, in the presence of a relatively small amount of brominated butyl rubber, the same used above, was determined. The rubber was compounded according to the following recipes and cured at 325° F. for various periods of time.

| Ingredient | C | D |
|---|---|---|
| Butyl Rubber | 100 | 100 |
| Brominated Butyl Rubber | | 5 |
| Amberol ST-137 | 12 | 12 |
| Carbon Black (HAF) | 60 | 60 |
| Stearic Acid | 1 | 1 |
| Zinc Oxide | 5 | 5 |

The physical properties of recipes C and D, after being cured for 30, 60 and 120 minutes, were as follows:

Table III

| Physical Properties | C | D |
|---|---|---|
| Tensile Strength, p.s.i.: | | |
| 30 minutes | 1,925 | 2,325 |
| 60 minutes | 2,275 | 2,440 |
| 120 minutes | 2,315 | 2,535 |
| Elongation, percent: | | |
| 30 minutes | 610 | 505 |
| 60 minutes | 480 | 415 |
| 120 minutes | 375 | 350 |
| Shore "A" Hardness: | | |
| 30 minutes | 67 | 68 |
| 60 minutes | 69 | 71 |
| 120 minutes | 73 | 72 |
| Modulus at 100% E, p.s.i.: | | |
| 30 minutes | 285 | 430 |
| 60 minutes | 385 | 515 |
| 120 minutes | 550 | 575 |

The results illustrate the increase in cure rate brought about by vulcanizing butyl rubber with a phenolic resin curing agent in the presence of a small amount of brominated butyl rubber. While larger amounts of brominated butyl rubber may be used to accelerate the cure, it is preferred to use about 3 to 10 parts by weight per 100 parts butyl rubber.

EXAMPLE IV

Again, as in the case of Recipes A and B above, the vulcanizates of recipes C and D were aged at 400° F. for 16 hours. The results of this study are set forth below.

Table IV

| Physical Properties | C | D |
|---|---|---|
| Tensile Strength, p.s.i.: | | |
| 30 minutes | 1,185 | 1,275 |
| 60 minutes | 1,220 | 1,295 |
| 120 minutes | 1,195 | 1,310 |
| Elongation, percent: | | |
| 30 minutes | 285 | 250 |
| 60 minutes | 280 | 245 |
| 120 minutes | 275 | 245 |
| Shore "A" Hardness: | | |
| 30 minutes | 73 | 75 |
| 60 minutes | 74 | 75 |
| 120 minutes | 74 | 75 |
| Modulus at 100% E, p.s.i.: | | |
| 30 minutes | 440 | 515 |
| 60 minutes | 465 | 495 |
| 120 minutes | 455 | 530 |

These data demonstrate that accelerating the cure of butyl rubber by vulcanizing it with a phenolic resin, in the presence of a small amount of brominated butyl rubber, does not have a deleterious effect on its heat-aging stability. An unexpected feature of this invention is that the addition of brominated butyl rubber brought about an increase in tensile strength as well as a greater modulus at 100% elongation. Thus it is possible to not only accelerate the cure of butyl rubber but also enhance its physical properties by vulcanizing it in the presence of a phenolic resin and brominated butyl rubber.

Thus, according to the present invention, the curing rate of brominated butyl rubber is unexpectedly increased by vulcanizing it in the presence of a phenol dialcohol compound. In addition to this, it has been discovered that the vulcanization rate of butyl rubber is greatly increased by heating it with a phenol dialcohol curing aid in the presence of a relatively small amount of brominated butyl rubber.

Referring now to the drawings, FIGURE 1 depicts a pneumatic tubeless tire which comprises a hollow, toroidal type member which is substantially U-shaped in cross-section by virtue of the open portion which extends around the inner periphery of the member. The tire is of a tubular type structure which has a cross-section in the form of an open-bellied body with spaced terminal portions to define a member generally resembling a horseshoe. The terminal portions constitute the bead portion 11—11 of the tire inside of which are a plurality of bead wires adhesively embedded and molded in a rubber. The outer surface of the bead portion is advantageously formed into an air-sealing means, such as a plurality of ribs to aid in the adhesion to the rim 12 when the tire is inflated. The outer surface of the tire also includes tread area 13 and sidewalls 14. The open portion of the horseshoe-shaped tire faces that portion of the inner circumference of the tire which is adjacent the said tread area 13 of the tire.

The remaining construction of the tire may vary according to conventional fabrication, but in general the tire is a multi-layered type of structure with an outer layer as above mentioned. The layer next adjacent the outer layer generally comprises a carcass 15 which includes the rubber which has incorporated therein a fabric composed of a plurality of cotton, rayon, steel or nylon cords. The tire also includes an inner lining 16, advantageously made from rubber, e.g., butyl rubber which has been at least partially vulcanized for about 1 to 60 minutes at about 250 to 400° F. in accordance with the present invention. Thus, it may consist of either a brominated butyl rubber which was cured with a phenol dialcohol compound or a butyl rubber which was cured with a dimethylol phenol compound in the presence of a small amount of brominated butyl rubber. This inner lining must be substantially impermeable to air. The above multi-layers, at least 3 in number, are conventionally bonded or otherwise adhered together, for example, by cementing and/or by vulcanizing in the presence of a dimethylol phenol compound and brominated butyl rubber according to the present invention, to form a tire of a unitary structure.

The compositions of the butyl rubber of the present invention may be employed generally throughout the tire. For example, the inner lining 16 may comprise butyl rubber which has been vulcanized in accordance with the present invention, for example in the presence of a small amount of brominated butyl rubber. Alternatively, the inner lining 16 may comprise ordinary butyl rubber which has been bonded to the carcass 15 by an interposed tie ply of butyl rubber which has been vulcanized in accordance with the present invention. For example, it may be a brominated butyl rubber which has been vulcanized in the presence of a small amount of a dimethylol phenol compound. Such interposed tie ply facilitates the inclusion of highly unsaturated rubbers such as natural rubber, GR–S rubber, Buna–N rubber and mixtures thereof, in the carcass.

The outer layers of the tire, such as the intermediate carcass layer and/or the outer layer (including the tread area, sidewall and outer bead portions) may also comprise butyl rubber vulcanized in accordance with the present invention. Vulcanization of the carcass, plies (if any), sidewalls, and tread area is advantageously accomplished by heating the same for about 3 to 60 minutes or more at about 250 to 400° F. The brominated butyl rubber compositions of the present invention which are used in the tire may also contain certain bivalent metal oxides and especially zinc oxide and/or magnesium oxide with or without added sulfur.

The tubeless tire may also contain, in at least the tread area 13, an oil-extended high molecular weight (e.g., viscosity average molecular weight of about 900,000 to about 2,000,000) butyl rubber which has been bonded to a highly unsaturated rubber or rubbers in the carcass 15 by an interposed tie ply of brominated butyl rubber, which has advantageously been vulcanized in the presence of a phenol dialcohol compound in accordance with the present invention.

The combination of advantages realized by the present vulcanization process renders the invention particularly suited for the manufacture of curing bags. In the accompanying drawings, FIGURE 2 illustrates a curing bag made of a vulcanizate of the invention. A suitable formulation for a curing bag is as follows.

| Ingredients: | Parts by weight |
|---|---|
| Brominated butyl rubber | 100 |
| Zinc oxide | 5 to 20 |
| Carbon black | 50 to 100 |
| Stearic acid | 1 to 2 |
| Amberol ST–137 (dimethylol phenol condensate) | 8 to 15 |

Non-black fillers, such as silicas or aluminum and calcium silicate, may be used in place of carbon black. The quantity of filler used will vary according to the particular need.

The above compound is shaped into the form of a curing bag 17 in accordance with the conventional practice and cured in a mold at 300 to 350° F. for 20 minutes to 1½ hours. The curing bag 17 is an annular toroidal form and has an external shape corresponding to the interior contour of the pneumatic tire casing to be cured thereon, and is equipped with the usual connecting stem 18, by means of which a heated fluid under pressure, such as hot water or steam, may be introduced into the interior cavity of the bag during vulcanization of the tire. The bag may thereby be expanded to cause the tire to conform closely to the surfaces of the mold cavity in which the tire is vulcanized. The resulting curing bag is far supeiror to the conventional curing bags in its resistance to deteriorating influences.

FIGURE 3 is a hollow, cylindrical bladder 19 of the type used in Bag-O-Matic tire presses made with rubber prepared according to the present invention. The top 20 and the bottom 21 of the bladder are sealed when in position on the press by a combination of bead and clamping rings, not shown, which also form the bead area of the tire mold. A Bag-O-Matic tire press is illustrated and described on pages 314 and 318–319 in Machinery and Equipment for Rubber and Plastics, vol. I, Primary Machinery and Equipment (1952), compiled by R. G. Seaman and A. M. Merrill.

Another embodiment of the present invention is its use in conveyor belts and steam hoses. The heat-resistant properties of bromine containing butyl rubber made according to the present invention make it particularly adaptable for use in steam hoses and conveyor belts where carrying hot material is involved.

FIGURE 4 shows a conveyor belt 22 containing butyl rubber vulcanized in the presence of a phenol dialcohol curing aid according to the present invention in position on a drive roller 23, idle roller 24 and idle roller supports 25. A suitable recipe is as follows.

| Ingredients: | Parts by weight |
|---|---|
| Butyl rubber | 100 |
| Zinc oxide | 5 to 20 |
| Amberol ST–137 (dimethylol phenol condensate) | 8 to 15 |
| Brominated butyl rubber | 2 to 50 |
| Carbon black | 50 to 90 |
| Process oil | 10 to 30 |
| Antioxidant | 1 to 2 |

The belt may consist wholly of rubber or may be supported or have embedded within the rubber a fabric 26.

FIGURE 5 shows a central longitudinal section broken away of a flexible rubber tube 27. A suitable formula for the rubber used in steam hoses is

| Ingredients: | Parts by weight |
|---|---|
| Butyl rubber | 100 |
| Zinc oxide | 5 to 20 |
| Amberol ST–137 (dimethylol phenol condensate) | 8 to 15 |
| Brominated butyl rubber | 2 to 50 |
| Carbon black | 50 to 90 |
| Process oil | 10 to 30 |
| Antioxidant | 1 to 2 |

Again, as in the case of the conveyor belt, the rubber may be supported by a fabric 28.

Resort may be had to various modifications and variations of the present invention without departing from the spirit or scope of the appended claims.

What is claimed is:

1. A composition of matter which comprises: 100 parts by weight of an unhalogenated rubbery copolymer of 85 to 99.5 wt. percent of a $C_4$ to $C_8$ isoolefin and 0.5 to 15 wt. percent of a $C_4$ to $C_{10}$ multiolefin; 2 to 50 parts by weight of a brominated copolymer of 85 to 99.5 wt. percent of a $C_4$ to $C_8$ isoolefin and 0.5 to 15 wt. percent of a $C_4$ to $C_{10}$ multiolefin, said brominated copolymer containing at least 0.5 wt. percent combined bromine; and a heat-reactive, oil-soluble, 2,6-dimethylol-4-$C_3$ to $C_{20}$ alkyl phenol resin.

2. The composition of claim 1 which contains 3 to 10 parts by weight of said brominated copolymer, and wherein said phenol resin is a 2,6-dimethylol-4-octyl phenol resin.

3. The composition of claim 1 wherein said phenol resin is a 2,6-dimethylol-4-tertiary butyl phenol resin.

4. A process for improving the vulcanization of a rubbery copolymer of 85 to 99.5 wt. percent of a $C_4$ to $C_8$ isoolefin and 0.5 to 15 wt. percent of a $C_4$ to $C_{10}$ multiolefin which comprises, mixing 100 parts by weight of said rubbery copolymer with about 2 to 50 parts by weight of a brominated copolymer of 85 to 99.5 wt. percent of a $C_4$ to $C_8$ isoolefin and 0.5 to 15 wt. percent of a $C_4$ to $C_{10}$ multiolefin, said brominated copolymer containing at least 0.5 wt. percent combined bromine, further admixing said rubbery copolymer with about 5 to 20 parts by weight of a heat-reactive, oil-soluble, 2,6-dimethylol-4-$C_3$ to $C_{20}$ alkyl phenol resin, and heating the resulting admixture at a temperature of between 250° F. and 400° F. so as to cure said admixture.

5. The process of claim 4 wherein said dimethylol phenol resin is 2,6-dimethylol-4-tertiary butyl phenol resin.

6. The process of claim 4 wherein said dimethylol phenol resin is 2,6-dimethylol-4-octyl phenol resin.

7. The process of claim 4 wherein 3 to 10 parts by weight of said brominated copolymer is employed per 100 parts by weight of said rubbery copolymer.

8. A process for increasing the cure rate of a rubbery copolymer of isobutylene and a conjugated diolefin having from 4 to 10 carbon atoms which comprises mixing 100 parts by weight of said rubbery copolymer with about 2 to 50 parts by weight of a similar brominated copolymer containing at least 0.5 wt. percent, combined bromine, about 0–50 parts by weight of metaloxide and about 5 to 20 parts by weight of a heat reactive, oil soluble 2,6-dimethylol-4-$C_3$ to $C_{20}$ alkyl phenol resin, heating the resulting mixture at a temperature between 250 and 400° F. for from 1 minute up to 2 hours to effect a curing thereof, and recovering a vulcanized rubbery copolymer.

References Cited in the file of this patent

UNITED STATES PATENTS

| | | |
|---|---|---|
| 2,631,984 | Crawford et al. | Mar. 17, 1953 |
| 2,681,899 | Crawford et al. | June 22, 1954 |
| 2,698,041 | Morrissey et al. | Dec. 28, 1954 |
| 2,701,895 | Tawney et al. | Feb. 15, 1955 |
| 2,720,479 | Crawford et al. | Oct. 11, 1955 |
| 2,726,224 | Peterson et al. | Dec. 6, 1955 |
| 2,727,874 | Peterson et al. | Dec. 20, 1955 |
| 2,833,734 | Morrissey et al. | May 6, 1958 |
| 2,857,357 | Smith | Oct. 21, 1958 |